(12) United States Patent
Navarro et al.

(10) Patent No.: US 7,069,666 B2
(45) Date of Patent: Jul. 4, 2006

(54) SPINDLE SQUARING APPARATUS

(76) Inventors: Joseph R. Navarro, 1991 Poarch Rd., Lincolnton, NC (US) 28092; Mariam M. Navarro, 1991 Poarch Rd., Lincolnton, NC (US) 28092

( * ) Notice: Subject to any disclaimer, the term of this patent is extended or adjusted under 35 U.S.C. 154(b) by 0 days.

(21) Appl. No.: 11/007,526

(22) Filed: Dec. 8, 2004

(65) Prior Publication Data

US 2005/0120574 A1    Jun. 9, 2005

Related U.S. Application Data

(63) Continuation-in-part of application No. 10/338,743, filed on Jan. 8, 2003, now Pat. No. 6,832,440.

(51) Int. Cl.
    *B23Q 17/22*    (2006.01)
(52) U.S. Cl. ............... 33/638; 33/626; 33/642
(58) Field of Classification Search .......... 33/638, 33/626, 628, 642, 533, 832, 535
    See application file for complete search history.

(56) References Cited

U.S. PATENT DOCUMENTS

| | | | |
|---|---|---|---|
| 1,659,969 A * | 2/1928 | Baker ........................... | 33/832 |
| 3,688,412 A | 9/1972 | Keener | |
| 3,763,570 A | 10/1973 | Anderson | |
| 4,085,515 A | 4/1978 | Darden | |
| 4,376,341 A | 3/1983 | Lombardo | |
| 4,406,069 A | 9/1983 | Clement | |
| 4,434,558 A | 3/1984 | Face | |
| 4,437,803 A | 3/1984 | Volna | |
| 5,074,051 A | 12/1991 | Cordy | |
| 5,131,161 A | 7/1992 | Drag | |
| 5,133,135 A * | 7/1992 | Durfee, Jr. ................... | 33/535 |
| 5,205,046 A * | 4/1993 | Barnett et al. ............... | 33/533 |
| 5,253,425 A | 10/1993 | Wozniak | |
| 5,454,170 A * | 10/1995 | Cook ........................... | 33/645 |
| 6,832,440 B1 * | 12/2004 | Navarro et al. ............... | 33/638 |

OTHER PUBLICATIONS

Accudyne Corporation, EZ-Tram, "Industrial Machine Trader," Sep. 23, 2003, p. No. 43, vol. 20, Issue 39; A Heartland Industrial Group Publication, Fort Dodge, IA.

* cited by examiner

*Primary Examiner*—Christopher W. Fulton
(74) *Attorney, Agent, or Firm*—Robert J. Yarbrough, Attorney at Law

(57) ABSTRACT

The Invention is an apparatus for squaring a spindle of a machine tool with a work holding surface. A shank is adapted to be connected to the spindle. The shank has a shank axis and is attached to a body. The body has a lower side from which depends a reference point. The reference point defines a measurement plane perpendicular to the shank axis. A first gauge having a spaced-apart relation to the reference point has a range of measurement that intersects the measurement plane. The range of measurement falls on a measurement axis parallel to the shank axis.

28 Claims, 13 Drawing Sheets

SPINDLE SQUARING APPARATUS

RELATIONSHIP TO OTHER APPLICATIONS

This application is a continuation-in-part of application Ser. No. 10/338,743 by Joseph R. Navarro, Sr. and Mariam M. Navarro filed Jan. 8, 2003 now U.S. Pat. No. 6,832,440. That application is hereby incorporated by reference as if set forth in full herein.

BACKGROUND OF THE INVENTION

1. Field of the Invention

The Invention is an apparatus for determining and adjusting the angle of the spindle of a machine tool with respect to the working holding surface of the machine tool. The Invention is particularly useful for squaring the spindle of a manual milling machine with respect to the table to which a work piece is to be attached.

2. Description of the Prior Art

Perpendicularity of the tool holder to the work holding surface must be established and quantifiably measured prior to setting up a manually operated spindle-type machine tool. If the spindle is not square to the table, the quality of any work performed using the machine tool may be severely compromised and may cause the resulting product to be rejected.

Establishing perpendicularity of a machine tool spindle to the workholding surface historically has been accomplished manually using labor-intensive procedures. Spindle machine tools generally have two separate angle adjusting mechanisms corresponding to angle adjustments in an "X" direction and in a "Y" direction. The angle of the spindle to the work holding surface generally is separately checked and set for each of the 'X' and 'Y' directions. U.S. Pat. No. 5,253,425 to Wozniak on Oct. 19, 1993 describes the usual prior art practice. In the prior art practice, one leg of an L-shaped member is affixed to the spindle of the machine tool. A precision dial indicator is attached to the other leg of the L-shaped member.

To check whether the spindle of a machine tool is square to the table with respect to the "X" direction using the prior art method, the operator first orients the L-shaped member in the 'X' direction and advances the spindle until the measuring tip of the dial indicator is in contact with the table. The operator reads the gauge, rotates the spindle by 180 degrees, and reads the dial indicator again. The generally accepted rule of thumb is that the difference between the two dial indicator readings should be within 0.0005 inches in 6 inches (0.013 mm in 15.24 cm) of separation between the locations of the two readings. If, for example, the indicator tip describes a circle twelve inches in diameter on the table and if the dial indicator reading varies by more than 0.001 inches along the circumference of the circle, the spindle is not adequately square with respect to the table. The operator will adjust the angle between the spindle and the table in the 'X' direction and repeat the measurement process until the spindle is adequately square to the table in the 'X' direction. The operator then repeats the process for the 'Y' direction.

Using the prior art method, the spindle must be rotated 180 degrees for each measurement and each measurement requires the dial indicator to be read twice. The requirement to rotate the spindle adds to the difficulty of the method and to the discomfort of the machinist, since the dial indicator generally has only one orientation and the machinist is required to change his or her position to read the dial indicator.

The design of manually operated spindle machines such as milling machines also complicates the process of squaring the spindle. These machines have an "off-center" pivot in the 'Y' direction making it troublesome for even an experienced machinist to square since it is difficult to judge the amount of adjustment required to bring the spindle of the machine into a perpendicular position. Frequent and time consuming adjustments are required since even the slightest movement may extrapolate into major misalignments because of the off-center nature of the machine tool's pivot.

Another variable is the amount of play in the gears of the machine tool's spindle head. Since these machine tools have useful lives of well over ten years, normal usage causes the gears to wear. While this may not compromise the performance of the machine once it is properly squared and set up, it does complicate the process of squaring the spindle head. The process of squaring the head of the machine tool can become more an intuitive art than a mechanical one, with the machinist often guessing at the amount of alignment necessary to accommodate the unknown level of play in the gears.

SUMMARY OF THE INVENTION

The apparatus of the Invention is an apparatus for use in squaring a spindle of a machine tool with respect to the work holding surface. The apparatus comprises a shank, a body attached to the shank and a first gauge attached to the body. Unlike prior art devices, a reference point depends from the lower side of the body in a spaced-apart relation to the first gauge. The reference point defines a measurement plane perpendicular to the shank axis. The reference point may be either fixed of movable.

Also unlike prior art devices, the lower side of the body includes a reference surface. To calibrate the apparatus, the reference surface is mated to a calibration surface, such as a surface plate. The calibration surface urges the measuring tip of the first gauge into a calibration position when the reference surface mates with the calibration surface. If the reference point is fixed, the reference point depends from the lower side of the body and terminates a known distance, for example 0.1250 inches, perpendicular to the calibration position of the first measuring tip. The gauge is then set to indicate a predetermined calibration value, for example minus 0.1250 inches, corresponding to the distance by which the reference point terminates perpendicular to the calibration position. Calibration is now complete.

Other calibration methods may be used and are described in the Description of an Embodiment. A gauge may be calibrated to indicate any pre-selected value when the spindle is square to the work holding surface.

After calibration, the single gauge embodiment of the Invention utilizing a fixed reference point is attached to the spindle of the machine tool using any conventional holding means, such as a collet. The operator will select either the 'X' or the 'Y' direction to check and adjust first. It is unimportant which direction is selected by the operator. This application will assume that the operator chooses to check and adjust the 'X' direction first.

The operator will orient the apparatus in the "X" direction and advance the spindle toward the work holding surface until the reference point touches the work holding surface. The operator then reads the first gauge, the measuring tip of which also is in contact with the work holding surface. For an apparatus calibrated as described above, if the gauge reading is within 0.0005 inches of zero for every six inches of separation between the reference point and the measurement axis of the first gauge, then the spindle of the machine tool is adequately square with respect to the work holding surface in the "X" direction. If the gauge reading indicates that the spindle is not adequately square to the workholding surface, the operator moves the apparatus out of contact with the work holding surface, adjusts the angle of the spindle in the "X" direction and repeats the process. Once the spindle is adequately square in the "X" direction, the operator will orient the spindle in the "Y" direction and will utilize the same procedure to check and to adjust the spindle in the "Y" direction.

If the reference point is movable, the reference point comprises the measuring tip of a second gauge. The measurement axis of the second gauge is parallel to the measurement axis of the first gauge and parallel to the shank axis. The measurement axis of the second gauge is in a spaced apart relation to the measurement axis of the first gauge. To calibrate the apparatus, the reference surface is placed on a calibration surface, such as a flat surface plate. The calibration surface urges the measuring tips of both the first and the second gauges into a calibration position. Where the calibration surface is a surface plate, the calibration position is flush with the reference surface. Both gauges are set to a predetermined value, such as zero, calibrating the apparatus.

After calibration, the shank of the movable reference point embodiment of the apparatus is attached to the spindle using a collet or other conventional means. The apparatus is oriented in the "X" direction and the spindle is advanced toward the table until both measuring tips of both gauges engage the table. The operator reads both gauges. If the difference between the readings of the two gauges is less than 0.0005 inches for every six inches of separation between the measurement axes of the first and second gauges, then the spindle is square with the table in the "X" direction. If the gauge readings indicate that the spindle is not adequately square to the workholding surface, the operator adjusts the angle of the spindle in the "X" direction and repeats the process. Once the spindle is adequately square in the "X" direction, the operator will orient the spindle in the "Y" direction and will utilize the same procedure to check and to adjust the spindle in "Y" direction.

Unlike the prior art, it is not necessary for the operator to rotate the spindle 180 degrees for each measurement using either the single gauge or the two gauge embodiment of the Invention. Unlike the prior art, the apparatus of the invention may be calibrated by placing the apparatus on a calibration surface, such as a surface plate, and setting either the single gauge or the two gauges to a predetermined calibration value.

DESCRIPTION OF AN EMBODIMENT

One Gauge Embodiment

Figure 1:
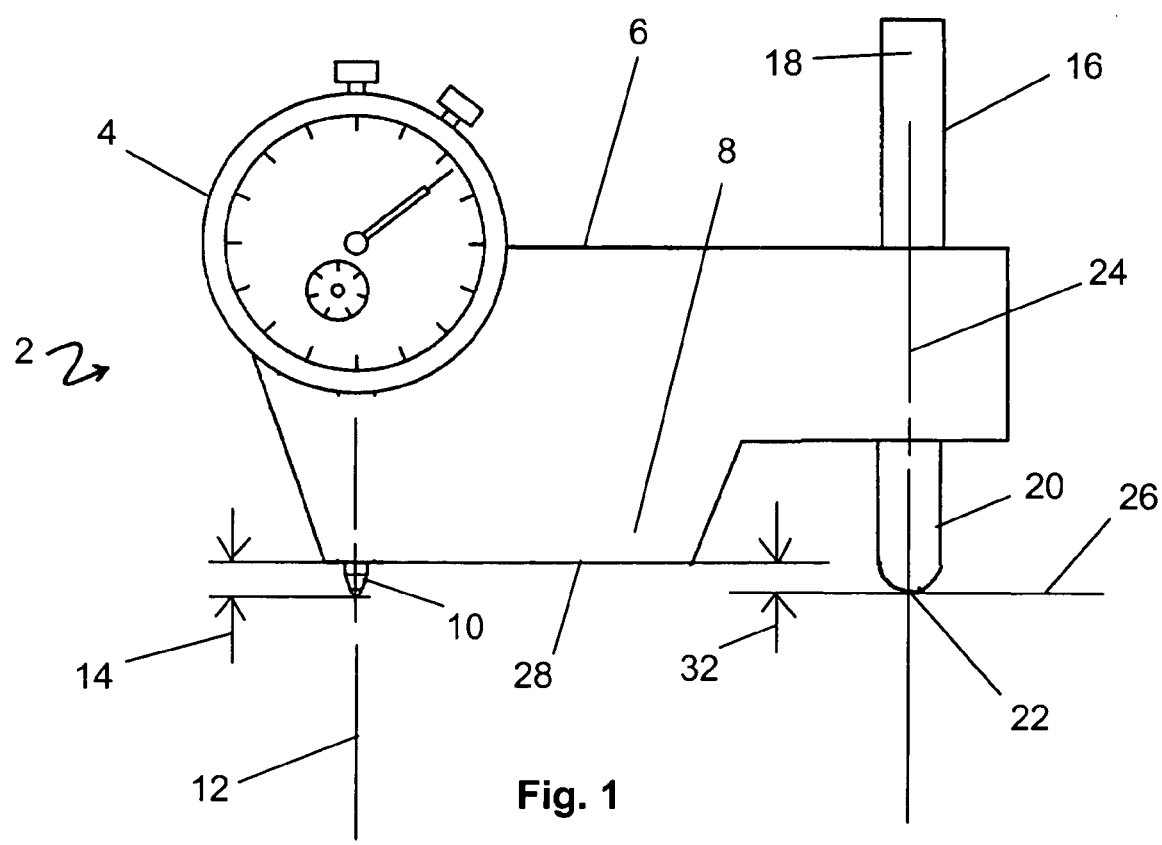
FIG. 1 is a side view of a single gauge embodiment of the apparatus.

An embodiment of the apparatus 2 of the Invention is shown by FIG. 1. In this embodiment, a first gauge 4 is attached to a transverse body 6. As used in this application, the term "gauge" means any of the devices known in the art for determining a distance. The term includes, without limitation, dial indicators, digital indicators, micrometers, depth gauges, height gauges, universal test indicators, thickness gauges, vernier scales, graduated scales, glass scales and all other means known in the art by which a distance between two objects may be determined. The body 6 has a lower side 8. The first gauge 4 has a first measuring tip 10 that extends through the lower side 8 of the body 6. The first measuring tip 10 is capable of moving along a first measurement axis 12. The first gauge 4 indicates the movement of the first measurement tip 10 along that first measurement axis 12. The first gauge 4 has a first range of measurement 14 along the first measurement axis 12.

A shank 16 is attached to the body 6 and extends through the body 6. The shank 16 has a first, or higher, end 18 and a second, or lower, end 20. The lower end 20 of the shank 16 is rounded so that the second end 20 of the shank 16 will define a reference point 22 where the shank 16 touches a flat surface. The shank 16 has a shank axis 24 running through the reference point 22. The shank axis 24 is parallel to and in a spaced apart relationship to the first measurement axis 12. The shank axis 24 and the reference point 22 together define a measurement plane 26 perpendicular to the shank axis 24 and perpendicular to the first measurement axis 12. The intersection between the measurement plane 26 and the first measurement axis 12 is within the first range of measurement 14 of the first gauge 4.

The lower side 8 of the body 6 has a reference surface 28. The reference surface 28 may be parallel to the measurement plane 26 and separated from the measurement plane 26 by a predetermined distance 32.

Calibration of a One Gauge Embodiment

Figure 2:
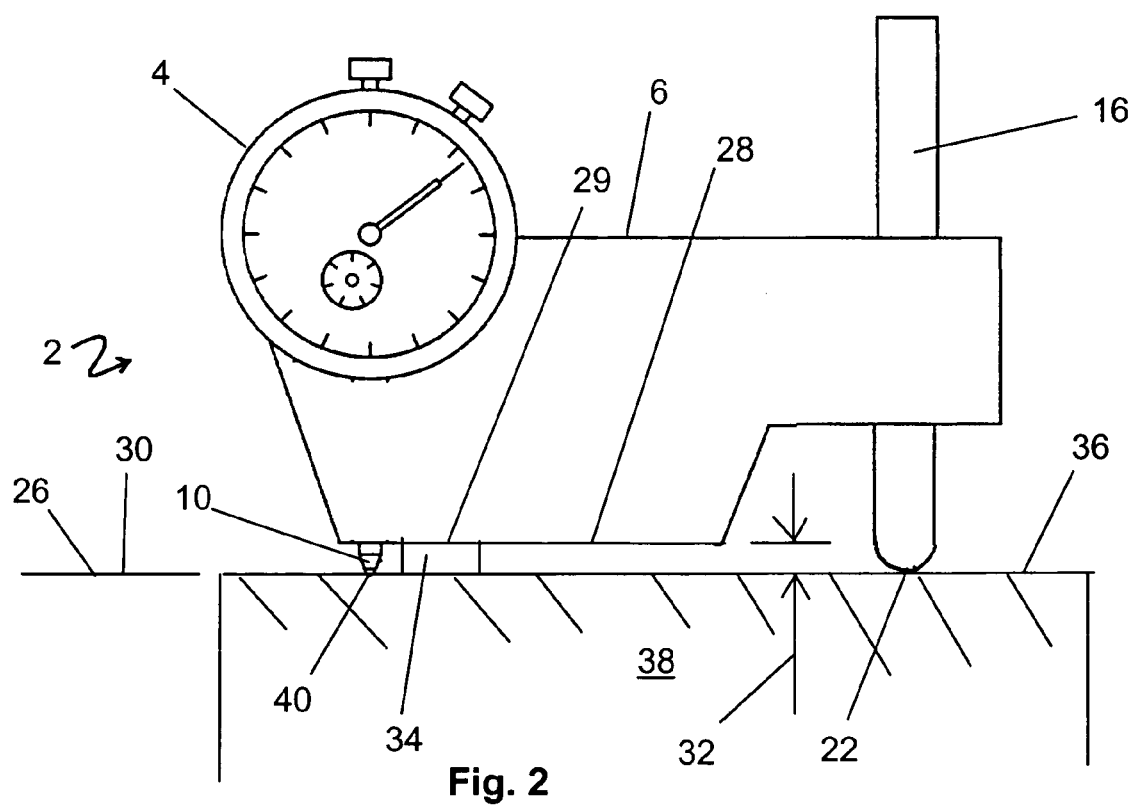
FIG. 2 is a side view of a first calibration method of the one gauge embodiment.
Figure 3:
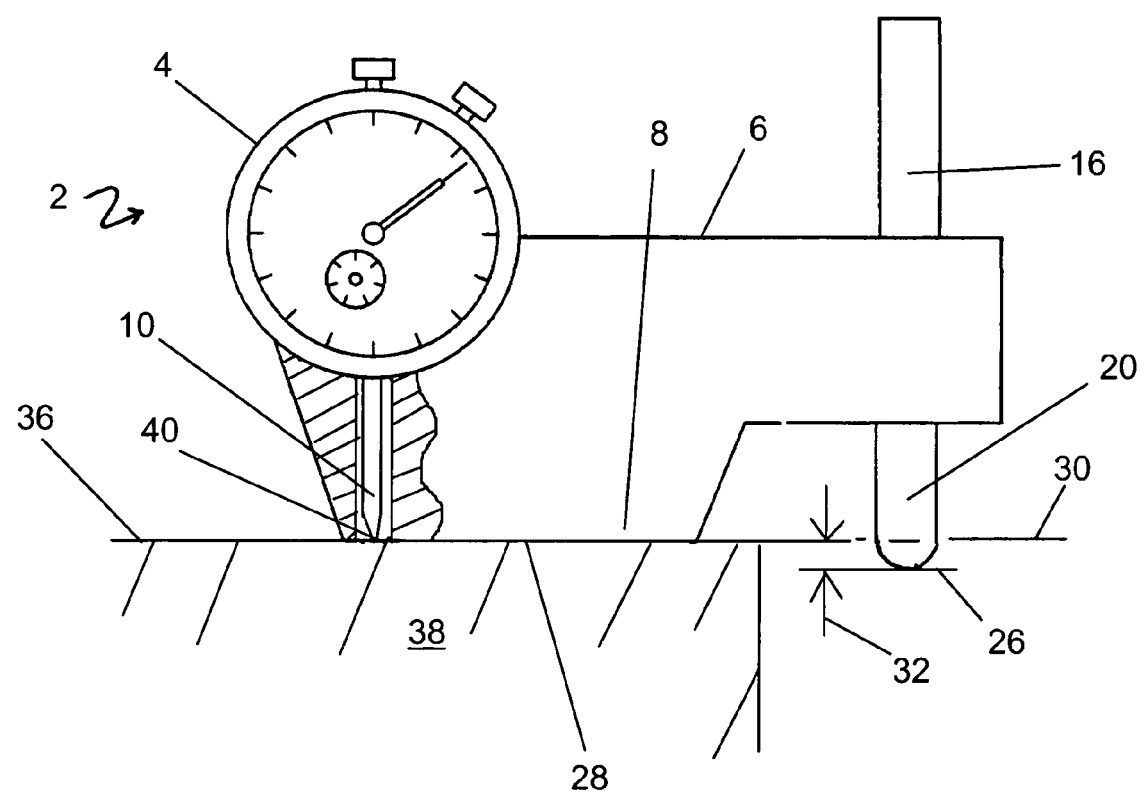
FIG. 3 is a side view of a second calibration method of the one gauge embodiment.

FIGS. 2 and 3 illustrate two methods to calibrate the apparatus 2 illustrated in FIG. 1. In the method shown by FIG. 2, a calibration spacer 34 is placed on a flat calibration surface 36, such as a granite surface plate 38. The calibration spacer 34 is selected so that its thickness is equal to the predetermined distance 32 between the measurement plane 26 and the reference surface 28. The apparatus 2 is then placed on the calibration surface 36 and is supported on the granite surface plate 38 at two locations: the calibration spacer 34 engaging the reference location 29 of the reference surface 28 and the reference point 22. The surface plate 38 depresses the first measuring tip 10 of the first gauge 4 until the first measuring tip 10 moves to a calibration position 40 that falls on the measurement plane 26. The operator sets the first gauge 4 to read a predetermined amount, such as zero. Using this calibration method, the first gauge will read zero when the spindle is square to the work holding surface. Calibration of the apparatus 2 is complete.

The calibration method illustrated by FIG. 3 dispenses with the calibration spacer 34. The apparatus 2 is placed so that the reference surface 28 on the lower side 8 of the body 6 engages the calibration surface 36. The apparatus 2 is placed so that the second end 20 of the shank 16 extends over the edge of the surface plate 38 and the apparatus 2 is supported only by the reference surface 28. The calibration surface 36 urges the first measuring tip 10 to a calibration position 40, shown by the partial cutaway on FIG. 3, flush with the reference surface 28. The operator then sets the first gauge 4 to read a pre-determined amount. If the predetermined distance 32 between the reference surface 28 and the measurement plane 26 is 0.1250 inches, the operator may set the first gauge 4 to minus 0.1250 inches, which would cause the first gauge to read zero when the spindle is square to the work holding surface. Calibration of the apparatus 2 is complete.

Use of the One Gauge Embodiment

Figure 4:
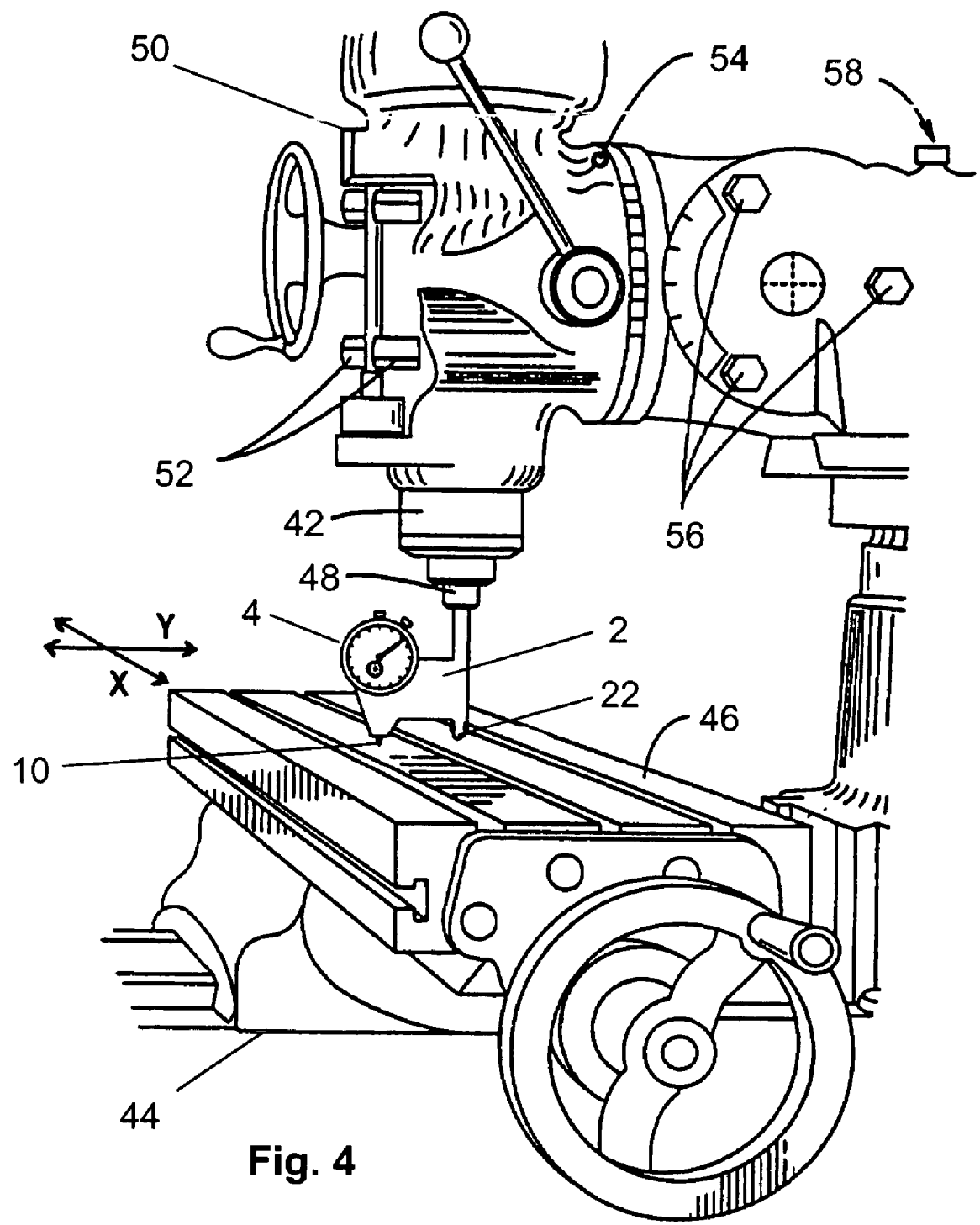
FIG. 4 is perspective view of the one gauge embodiment in use to square the spindle of a machine tool.

FIG. 4 illustrates the use of the apparatus 2 to square the spindle 42 of a machine tool 44 to the work holding surface 46. The work holding surface 46 in this instance is the table of a typical manual milling machine. The operator first calibrates the apparatus 2 as described above.

The operator will determine whether the spindle 42 is square to the work holding surface by placing the calibrated apparatus 2 in a collet 48 mounted on the spindle 42. The operator will orient the apparatus 2 in the 'X' direction (indicated by arrows on FIG. 4) and will advance the spindle 42 toward the work holding surface 46 until the reference point 22 touches the work holding surface 46. The operator then will read the first gauge 4. If the first gauge 4 is calibrated as described above, the first gauge 4 reading will be 'zero' if the spindle 42 is square to the work holding surface 46.

If the first gauge 4 reading differs from 'zero' by more than 0.0005 inches for every six inches of separation between the reference point 22 and the measuring tip 10, then the spindle 42 is not adequately square to the work holding surface 46 and the operator will adjust the angle of the spindle 42. To adjust the angle, the operator first will withdraw the spindle 42 until the reference point 22 is no longer touching the work holding surface 46. The spindle 42 of the milling machine is mounted to a head 50. The angle of the head 50, and hence the spindle 42, may be rotated in an 'X' direction by loosening 'X' direction locking nuts 52 to release the head 50 in the 'X' direction and then turning an 'X' direction adjusting screw 54 to change the angle of the head 50 with respect to the work holding surface 46. The operator will again check whether the spindle 42 is square with the head 50 in the 'X' direction by advancing the spindle 42 until the reference point 22 touches the work holding surface 46 and then reading the first gauge 4.

The operator will repeat the procedure until the spindle 42 is square with the work holding surface 46. The operator then will tighten the 'X' direction locking nuts 52, clamping the head 50 in position. The operator will check the angle of the spindle 42 after the locking nuts 52 are tightened, to ensure that tightening the nuts 52 does not change the angle of the spindle 42 to the work holding surface 46.

The operator will reorient the apparatus 2 to the 'Y' direction (indicated by arrows on FIG. 4) and repeat the process to check and square the spindle 42 with respect to the 'Y' direction. To change the angle of the head 50 in the 'Y' direction, the 'Y' direction locking nuts 56 are loosened, releasing the head 50. The 'Y' direction adjusting screw 58 is then turned to adjust the angle of the head 50 in the 'Y' direction. Once the desired angle is achieved, the operator tightens the 'Y' direction locking nuts 56, clamping the head 50 in position.

As indicated above, the operator may begin with either the 'X' or the 'Y' direction.

Two Gauge Embodiment

Figure 5:
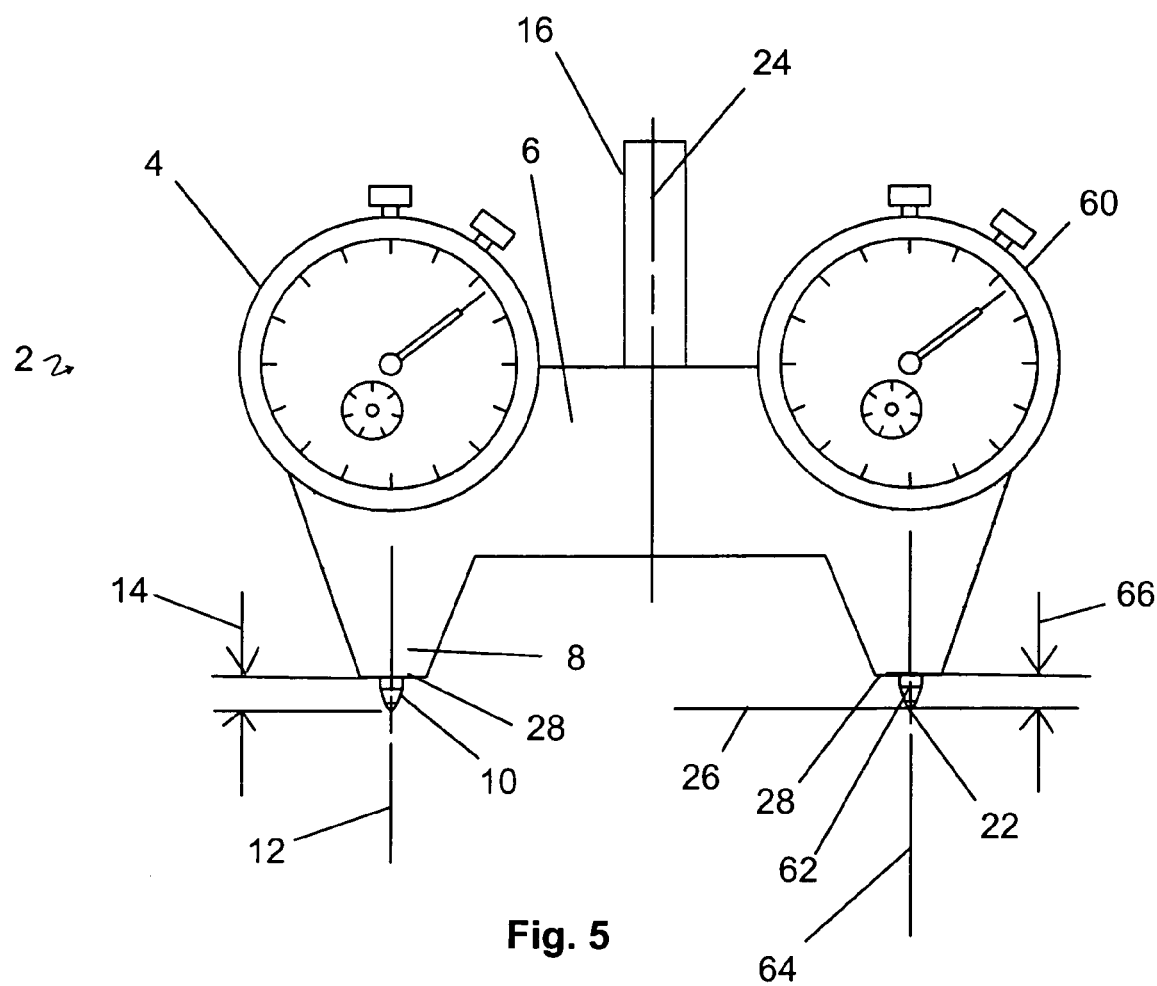
FIG. 5 is a side view of a two gauge embodiment.

FIG. 5 illustrates a two gauge embodiment of the Invention. As shown by FIG. 5, a shank 16 having a shank axis 24 is attached to a body 6. A first and a second gauge 4, 60 also are attached to the body 6. The first and second gauges 4, 60 have a first and a second measuring tip 10, 62, which respectively define a first and a second measurement axis, 12, 64. The first and second measurement axes 12, 64 are parallel to each other and to the shank axis 24. The first and second measurement axes 12, 64 are in a spaced apart relation to each other.

The second measuring tip 62 defines the reference point 22 and hence the measurement plane 26. Because the second measuring tip 62 is capable of moving along the second measurement axis 64, the reference point 22 and hence the measurement plane 26 are movable with respect to the body 6. The movement of the second measuring tip 62, and hence the reference point 22 and the measurement plane 26, define a second range of measurement 66 of the second gauge 60.

The first measuring tip 10 defines a first range of measurement 14 along the first measurement axis 12. The first and second ranges of measurement 14, 66 generally are coextensive. The body 6 has a lower side 8. The lower side 8 of the body 6 defines a reference surface 28.

Calibration of the Two Gauge Embodiment

Figure 6:
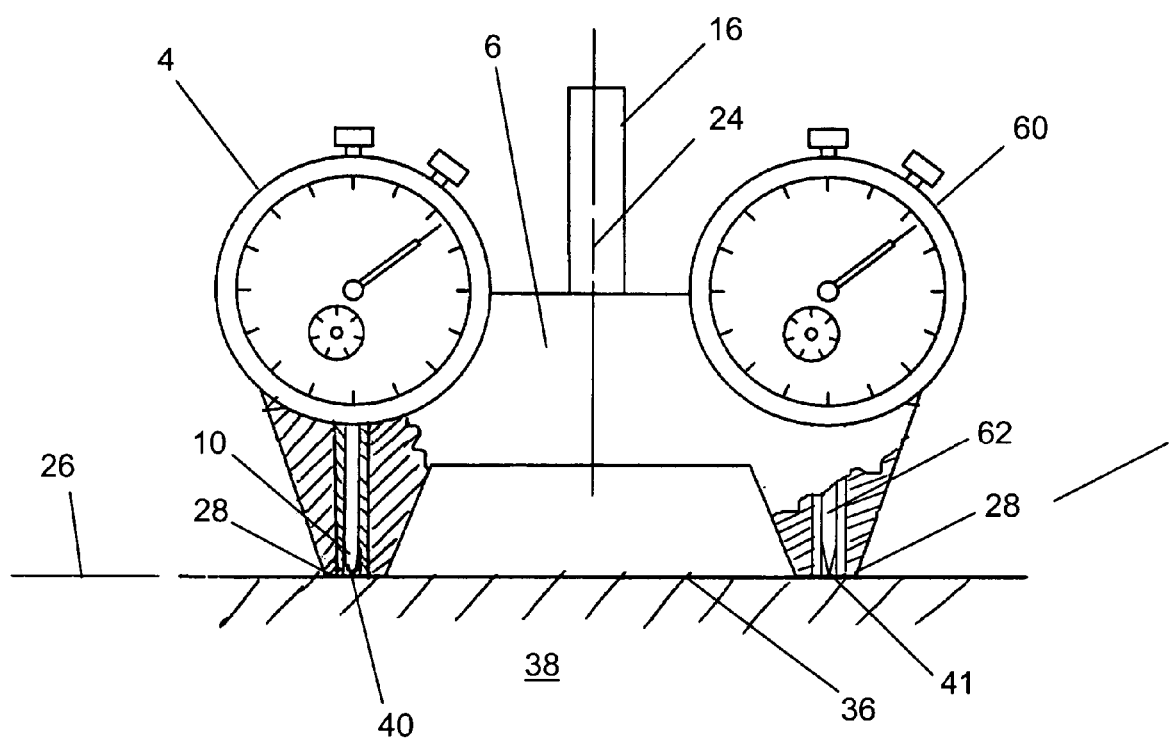
FIG. 6 is a partial cutaway side view of a two gauge embodiment during calibration.

Calibration of the two gauge embodiment is illustrated by FIG. 6. As shown by FIG. 6, the apparatus 2 is placed on a calibration surface 36, such as a granite surface plate 38. The apparatus 2 is supported on the calibration surface 36 by the reference surface 28. The calibration surface 36 urges the first and the second measuring tips 10, 62 into a first calibration position 40 and a second calibration position 41 flush with the reference surface 28. FIG. 6 includes a partial cutaway showing the first measuring tip 10 in the calibration position 40 and the second measuring tip 62 in the second calibration position 41. Because the calibration positions 40, 41 are perpendicular to the shank axis 24, the first measuring tip 10 and the second measuring tip 62 now are square to the shank axis 24. The operator will set both the first and second gauges 4, 60 to pre-determined calibration value, such as zero. Calibration of the apparatus 2 is complete.

Use of the Two Gauge Embodiment

Figure 7:
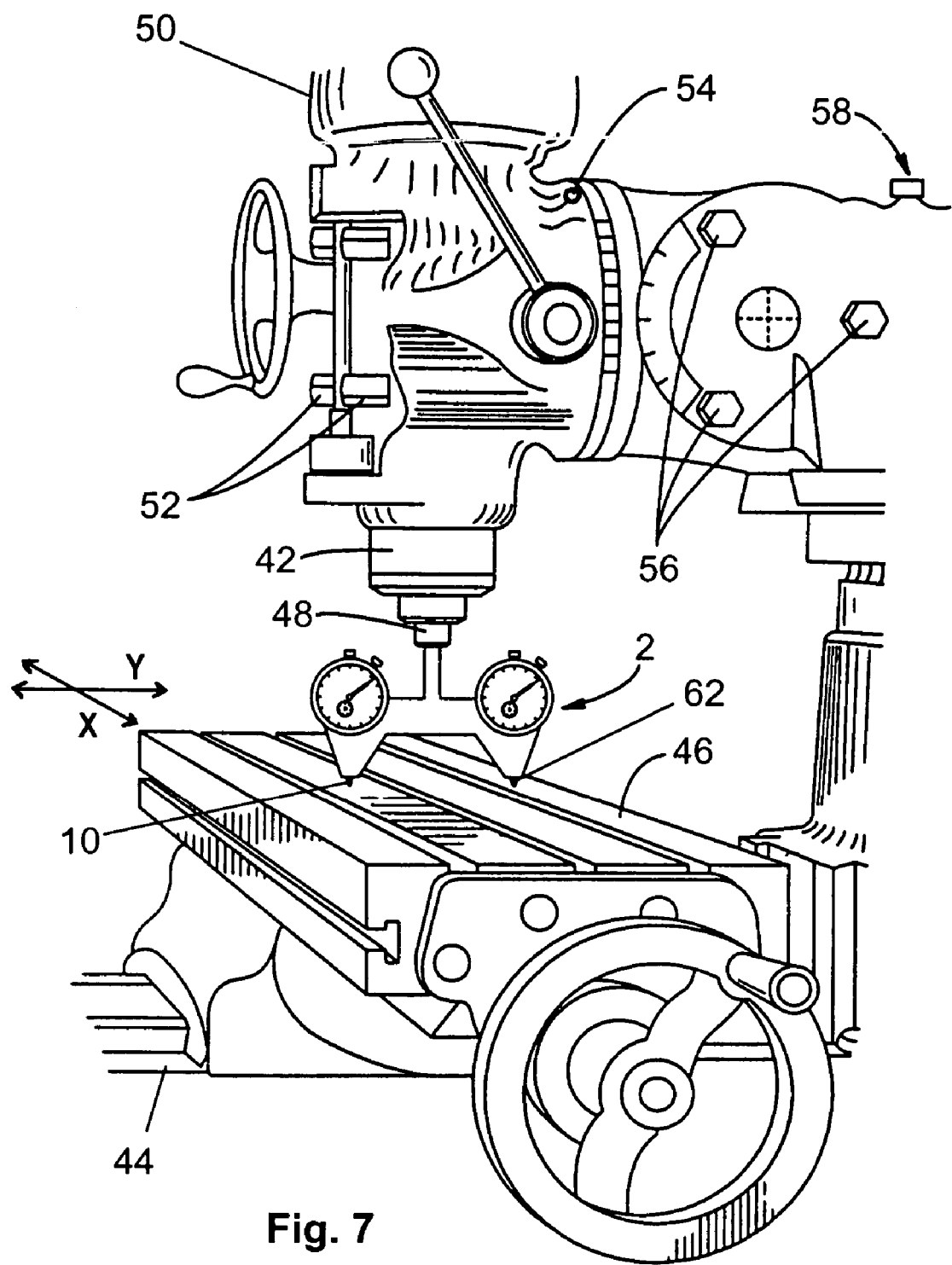
FIG. 7 is a two gauge embodiment during use to square the spindle of a machine tool.
Figure 8:
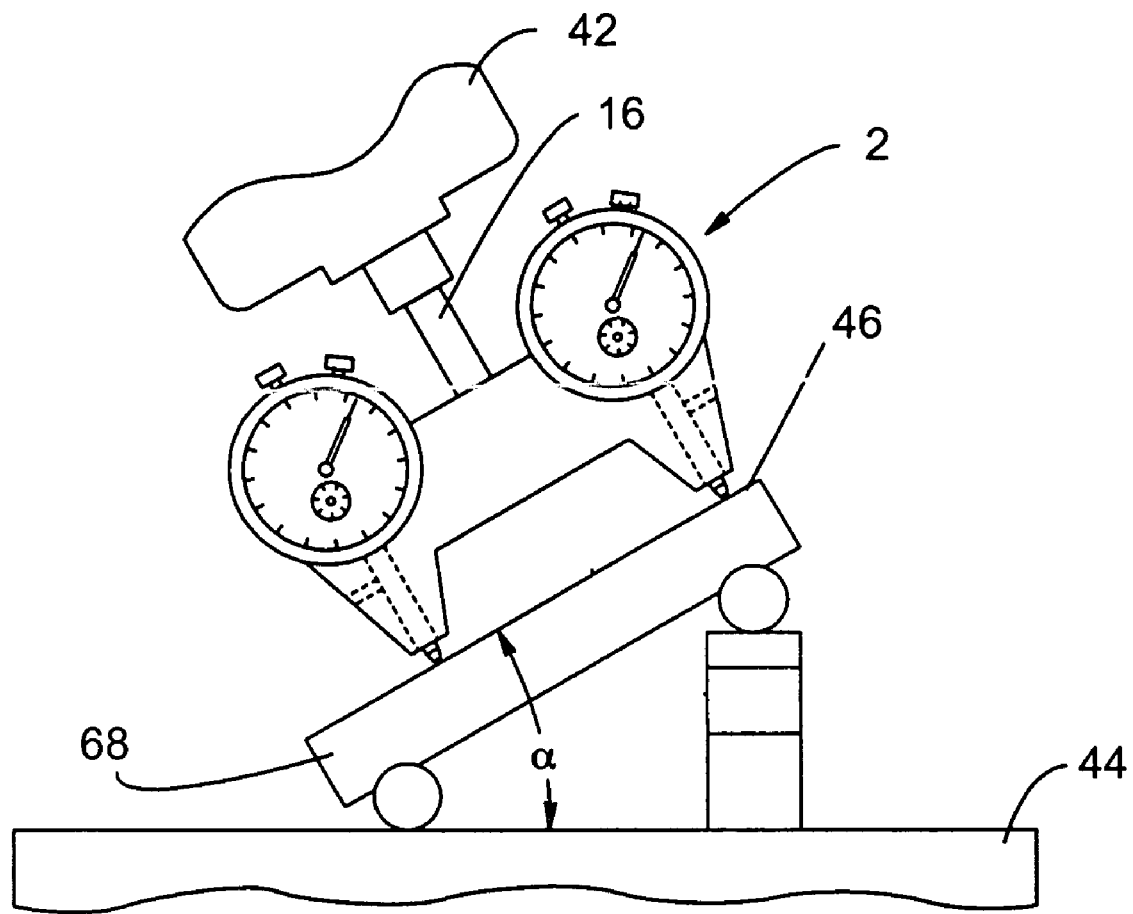
FIG. 8 is a two gauge embodiment being used with a sine bar.

FIGS. 7 and 8 illustrate the two gauge embodiment of the Invention in use to square the spindle 42 of a spindle machine tool 44. The work holding surface 46 shown by FIG. 7 is the table of a typical manual milling machine.

The operator will attach the first end of the shank 16 to the spindle 42 using a collet 48. The operator will orient the apparatus 2 in either the 'X' or the 'Y' direction and will advance the spindle 42 toward the work holding surface 46 until both the first and second measuring tips 10, 62 engage the work holding surface 46. If the difference in the readings of the two gauges does not exceed 0.0005 inches for every six inches of separation between the measurement axes 12, 64 of the first and second gauges 4, 60, spindle 42 is adequately square to the work holding surface 46. If the spindle 42 is not adequately square to the work holding surface 46, the operator will adjust the angle of the head 50 as indicated above for the One Gauge Embodiment.

One difference in the use of the one and two gauge embodiments is that in the two gauge embodiment it is not necessary for the operator to withdraw the reference point 22 (which is defined by second measuring tip 62) from contact with the work holding surface 46 to adjust the angle of the spindle 42.

The operator will reorient the apparatus 2 to the other of the 'X' and 'Y' directions and repeat the process to complete the squaring of the spindle 42 to the work holding surface 46.

FIG. 8 shows the apparatus 2 in use to square the spindle 42 to a work holding surface 46, in this instance a sine bar 68 that is at an angle to the table of a machine tool 44. The apparatus 2 may be used to square a spindle 42 to any workholding surface 46 at any orientation so long as the orientation is within the range of adjustment of the head 50 of the machine tool 44.

Alternative Embodiments

Figure 9:
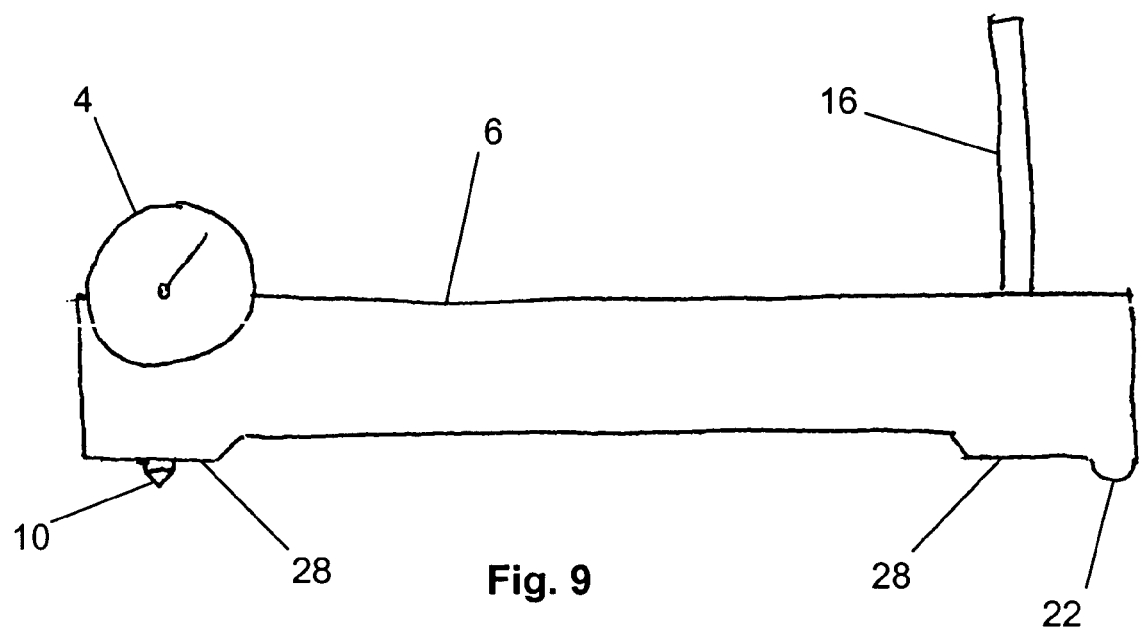
FIG. 9 is a one gauge embodiment where the reference point is defined by the body.
Figure 10:
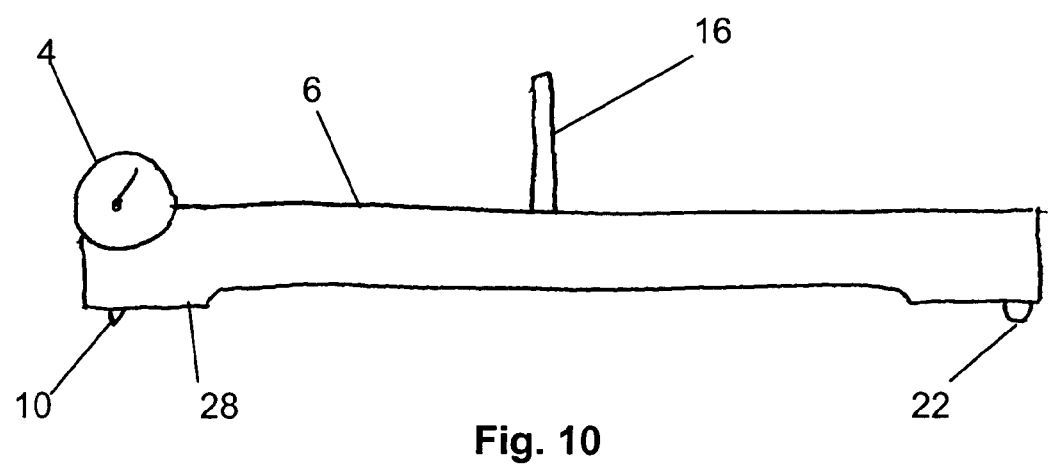
FIG. 10 is a one gauge embodiment where the shank is intermediate on the body between the gauge and reference point.

FIGS. 9–16 show alternative embodiments. FIGS. 9 and 10 show an embodiment where the fixed reference point 22 is defined by the body 6. In the embodiment shown by FIG. 10, the reference point 22 is in a spaced apart relation to both the shank axis 24 and to the first measurement axis 12.

Figure 11:
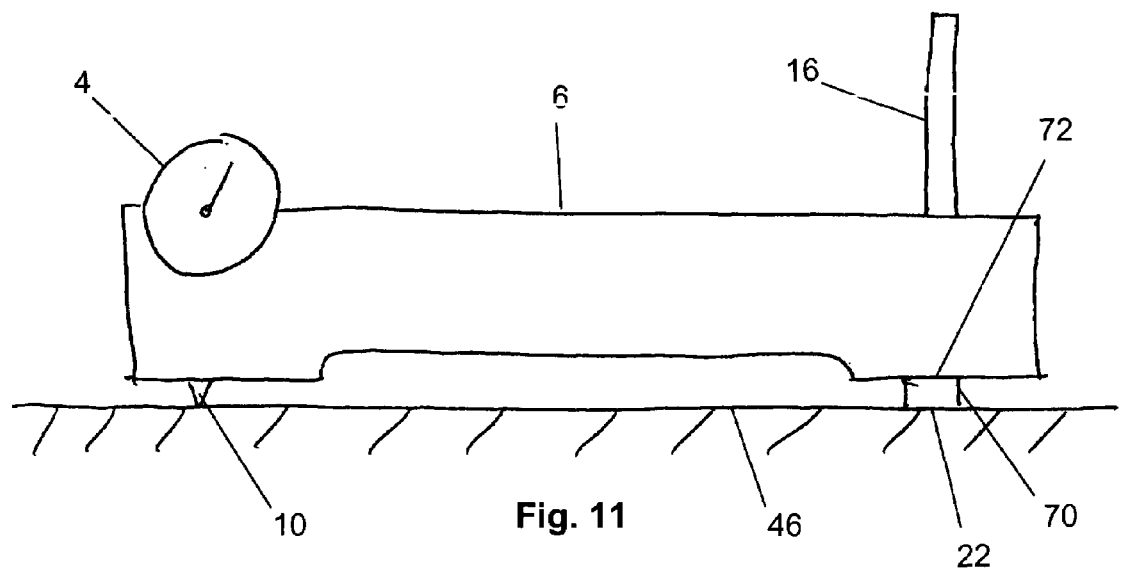
FIG. 11 is a one gauge embodiment where the reference point is defined by a spacer engaging a surface on the body.
Figure 12:
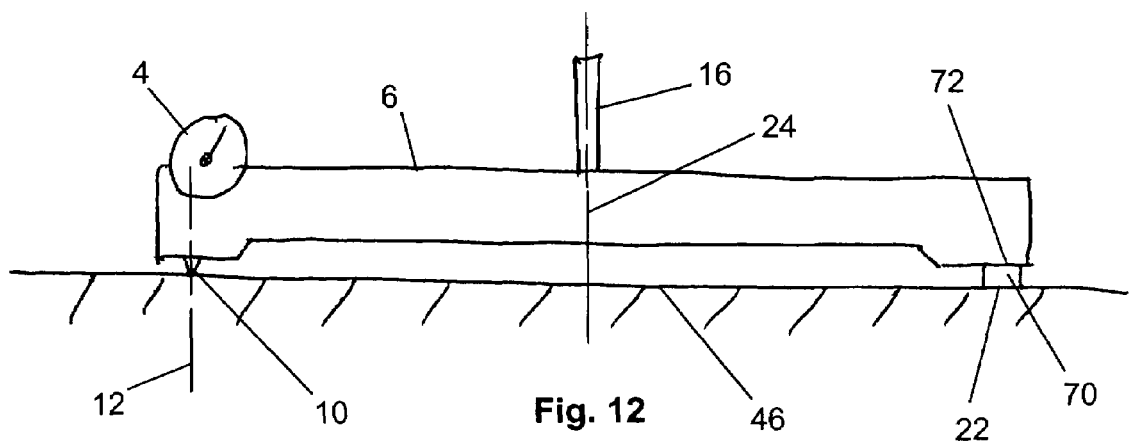
FIG. 12 is a one gauge embodiment where the reference point is defined by a spacer and the shank is intermediate to the reference point and gauge.

FIGS. 11 and 12 show an embodiment where the reference point 22 is defined by a removable reference member 70 in the form of a flat spacer that engages the lower side of the body 6 at a bottom location 72. FIG. 12 shows the vertically fixed reference point 22, in this case a removable reference member 70, in a spaced-apart relation to the shank axis 24 and the first measurement axis 12.

Figure 13:
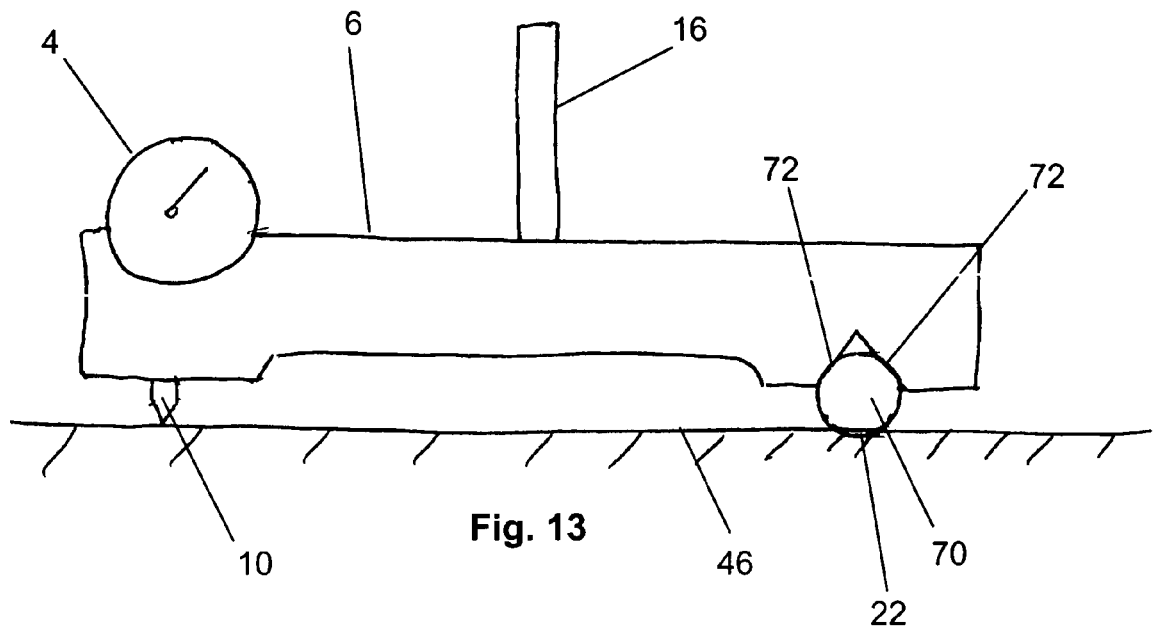
FIG. 13 is a one gauge embodiment where the reference point is defined by a spacer that is not flat.

FIG. 13 shows an embodiment where the reference member 70 is not flat and the surface 72 of the body 6 that engages the reference member 70 is not perpendicular to the shaft axis 24. In the instance illustrated by FIG. 13, the reference point 22 is defined by a reference member 70 having a circular cross section, but the reference member 70 can be of any convenient shape.

Figure 14:
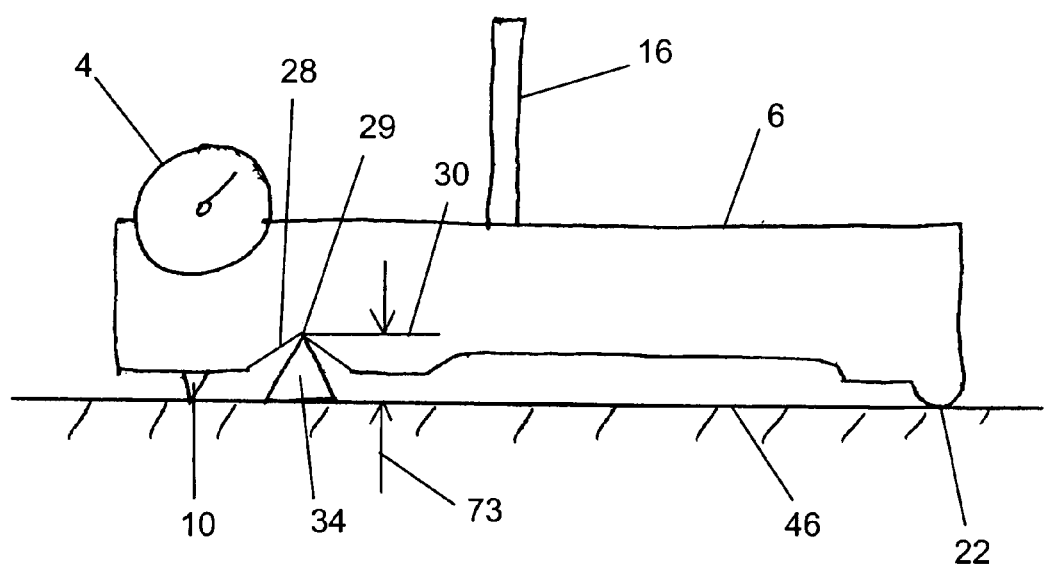
FIG. 14 is a one gauge embodiment where a calibration spacer is not flat.

FIG. 14 shows that a calibration spacer 34 is not required to be flat to be contemplated by the Invention. In the instance shown by FIG. 14, the calibration spacer 34 is triangular in cross section, but can be circular or any other convenient shape. FIG. 14 also shows that reference location 29 on the body 6 with which the calibration spacer 34 engages need not be parallel to the shank axis 24.

Figure 15:
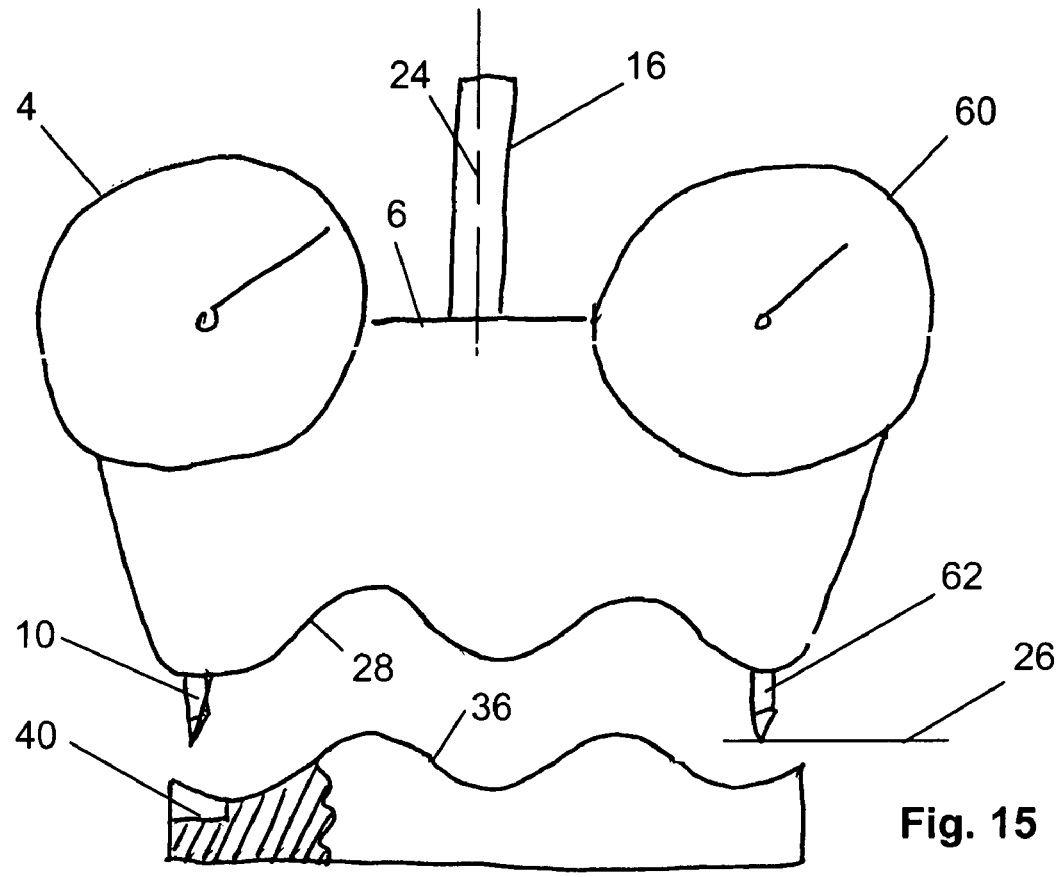
FIG. 15 illustrates a reference surface and calibration surface that are not flat.

As shown by FIG. 15, neither the reference surface 28 nor the calibration surface 36 necessarily is flat or perpendicular to the shank axis 24. Both the reference surface 28 and the calibration surface 36 may be irregular. As shown by FIG. 14, any calibration surface 36 that engages the reference surface 28 and defines pre-determined first calibration position 40 (shown by the partial cutaway) and second calibration position 41 (for the second gauge 60) is contemplated by the Invention.

Figure 16:
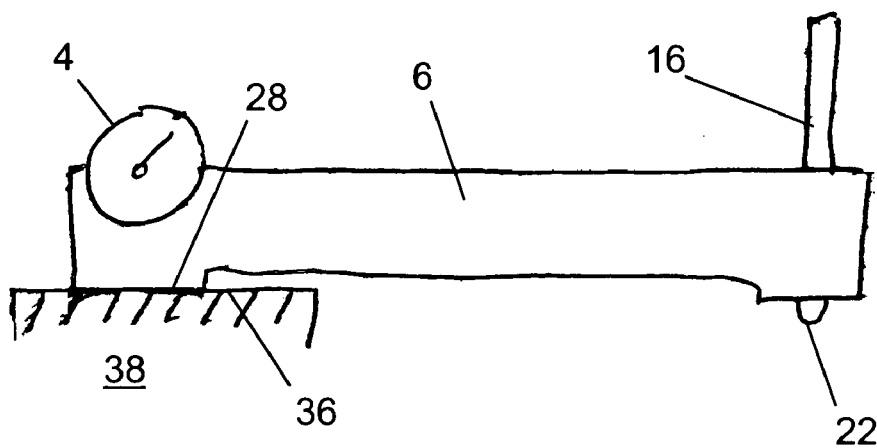
FIG. 16 illustrates a calibration surface that engages a reference surface local to the gauge.

FIG. 16 shows that the calibration surface 36 is not required to extend the length of the body 6, or even of the reference surface 28. So long as the calibration surface 36 is adequate to depress the measuring tip(s) 10, 62 to the calibration positions 40, 41, the calibration surface 36 is adequate.

Figure 17:
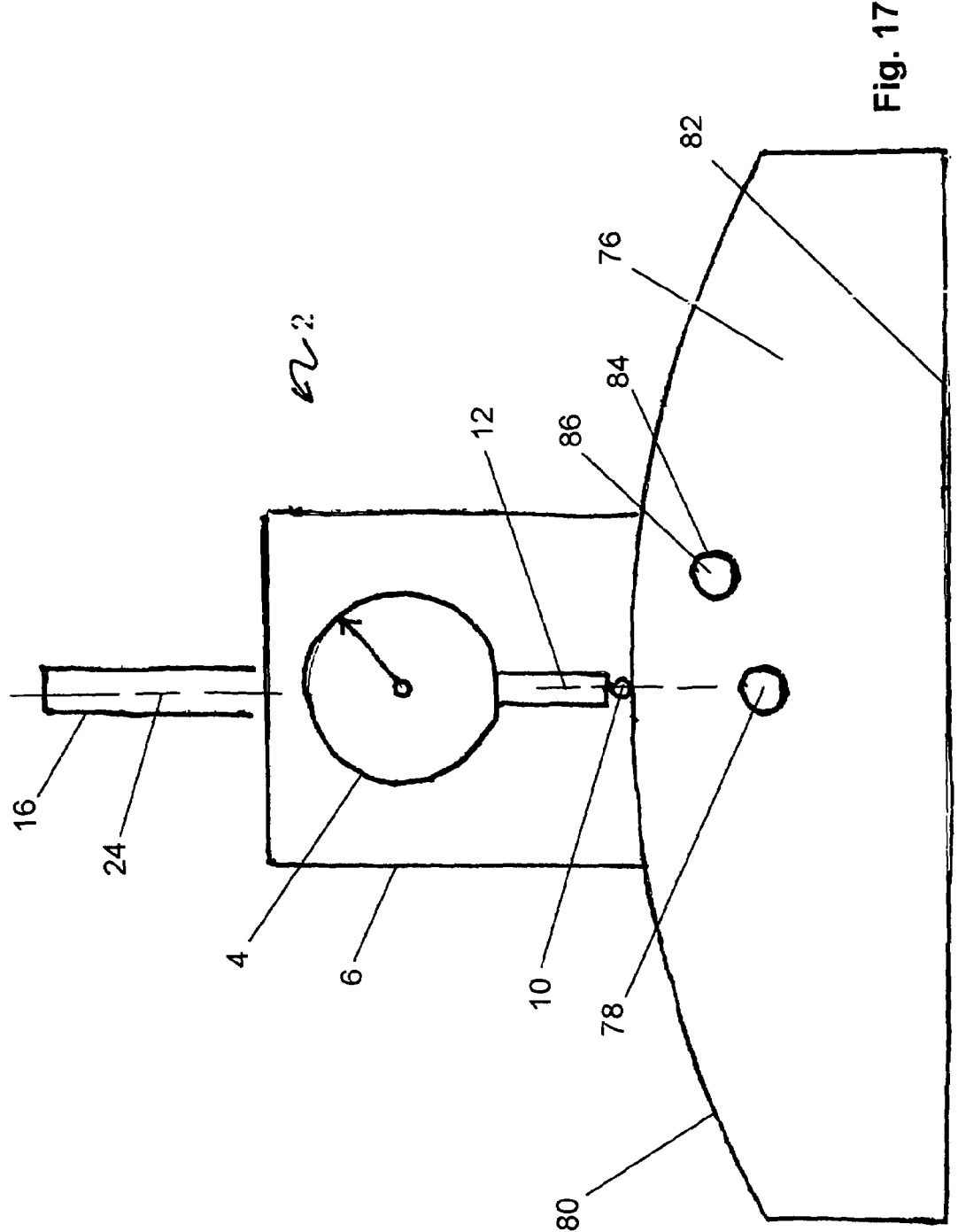
FIG. 17 illustrates an apparatus utilizing a rocker.

FIG. 17 shows an apparatus 2 having a shank 16 defining a longitudinal shank axis 24. A body 6 is attached to the shank 16. A first gauge 4 having a first measuring tip 10 is attached to the body 6. The first measuring tip 10 is movable along a first measurement axis 12. The first measurement axis 12 is parallel to the shank axis 24. A rocker 76 is attached to the body 6 by a pin 78. The rocker 76 is able to pivot about the pin 78. The rocker 76 defines a cam surface 80 that engages the first measuring tip 10. The curvature of the cam surface 80 is selected to achieve a desired degree of sensitivity of measurement. The greater the curvature of the cam surface 80 in the direction shown by FIG. 17, the smaller the change in reading of the first gauge 4 as the rocker 76 pivots, provided that the radius of curvature of the rocker is not less than the distance between first measuring tip 10 and the pivot 78. The rocker 76 also defines a lower surface 82.

To calibrate the apparatus 2 of FIG. 17, an optional body calibration hole is aligned with an optional rocker calibration hole 84. An optional calibration pin 86 is inserted in the body calibration hole and the rocker calibration hole 84, thereby aligning the two calibration holes and aligning the rocker 76 with the body 6. When the calibration pin 86 is inserted, the lower surface 82 of the rocker 76 is perpendicular to the shank axis 24. The operator sets the first gauge 4 to read a predetermined value, such as zero. The calibration pin 86 is removed and calibration is complete. The body calibration hole, rocker calibration hole 84 and calibration pin 86 are optional and are not required for operation of the rocker 76 embodiment.

To use the apparatus 2 of FIG. 17, the first end 18 of shank 16 is attached to the spindle 42 of a spindle machine tool 44 by a collet 48. The apparatus 2 is oriented in the 'X' or the 'Y' direction. The spindle 42 is advanced toward the work holding surface 46 until the lower surface 82 of the rocker 76 fully engages the work holding surface 46. The operator then reads the first gauge 4. If the first gauge 4 reading is acceptably close to the predetermined calibration reading, then the work holding surface 46 is adequately square. If not, the operator adjusts the angle of the head 50 of the machine tool 44 as described above. The operator then repeats the procedure for the other of the 'X' or 'Y' directions.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

We claim:

1. An apparatus for determining an angular relationship between a spindle of a machine tool and a work holding surface, the apparatus comprising:
   a. a body having a lower side;
   b. a reference surface defined by said lower side of said body, said reference surface being integral to said body;
   c. a shank, said shank having a shank axis, said shank being configured to be mounted to the spindle of the machine tool;
   d. a first gauge, said first gauge being mounted to said body, said first gauge having a first measurement axis generally parallel to and in a spaced-apart relation to said shank axis, said first gauge having a first range of measurement along said first measurement axis;
   e. a reference point operably connected to said lower side of said body, said reference point being in a spaced-apart relationship to said first gauge, said reference point defining a measurement plane perpendicular to said shank axis.

2. The Apparatus of claim 1 wherein said reference point is fixed with respect to said body, said first gauge has a first measuring tip, said first measuring tip defines said first range of measurement, said first range of measurement intersects said measurement plane, said reference surface being configured to selectably mate with a calibration surface, said first measuring tip being configured to be urged to a calibration position by said calibration surface when said calibration surface is mated to said reference surface, said calibration position being within said first range of measurement, said calibration position being a pre-determined distance perpendicular to said measurement plane.

3. The apparatus of claim 2, the apparatus further comprising: said calibration surface configured to selectably mate with said reference surface, said calibration surface being configured to urge said first measuring tip into said calibration position when said calibration surface is mated to said reference surface.

4. The apparatus of claim 3, said calibration surface being a surface plate.

5. The apparatus of claim 2 wherein said operable connection between said reference point and said lower side of said body comprises said lower side of said body defining said reference point.

6. The apparatus of claim 2 wherein said shank has a first end and a second end, said first end of said shank being configured to be attached to the spindle, said operable connection between said reference point and said lower side of said body comprising said second end of said shank defining said reference point.

7. The apparatus of claim 1 wherein said reference surface defines a reference surface location, said reference surface location being a fixed pre-determined distance perpendicular to said measurement plane, the apparatus further comprising: a calibration spacer configured to selectably engage said reference surface location, said calibration spacer having a dimension perpendicular to said measurement plane when said calibration spacer engages said reference surface location, said dimension of said calibration spacer being substantially equal to said fixed predetermined distance.

8. The apparatus of claim 1 wherein said reference point is movable with respect to said body, the apparatus further comprising: a second gauge, said second gauge being mounted to said body in a spaced-apart relation to said first gauge, said second gauge having a second measurement axis generally parallel to said shank axis, said second gauge having a second range of measurement along said second measurement axis, said second gauge having a second measuring tip, said second measuring tip defining said second range of measurement, said second measuring tip defining said reference point.

9. The apparatus of claim 8 wherein said first gauge has a first measuring tip, said first measuring tip defines said first range of measurement, said reference surface being configured to selectably mate with a calibration surface, said first measuring tip being configured to be urged to a first calibration position by said calibration surface when said reference surface is selectably mated with said calibration surface, said first calibration position being within said first range of measurement, said first calibration position being a pre-determined distance perpendicular to said measurement plane, said second measuring tip being configured to be urged to a second calibration position by said calibration surface when said reference surface is selectably mated with said calibration surface, said second calibration position being within said second range of measurement.

10. The apparatus of claim 9 wherein said pre-determined distance of said first measuring tip perpendicular to said measurement plane is substantially zero when said reference surface is selectably mated to said calibration surface, whereby said first measuring tip falls within said measurement plane.

11. The apparatus of claim 10, the apparatus further comprising: said calibration surface, said calibration surface being configured to selectably mate with said reference surface, said calibration surface being configured to urge said first measuring tip into said first calibration position and said second measuring tip into said second calibration position when said calibration surface is selectably mated to said reference surface.

12. The apparatus of claim 11 wherein said calibration surface is a surface plate.

13. The apparatus of claim 1, further comprising: a reference point member defining said reference point, said lower side of said body defining a reference point member receiving location, said operable connection between said reference point and said lower side of said body comprising said reference point member receiving location being configured to receive said reference point member.

14. An apparatus for determining an angular relationship between a spindle of a machine tool and a work holding surface, the apparatus comprising:
   a. a shank, said shank defining a shank axis and having a first end, said first end of said shank being configured to be mounted in the spindle of the machine tool;
   b. a body, said shank being connected to said body;
   c. a first means for measuring, said first means for measuring being operably connected to said body, said first means for measuring defining a first measurement axis, said first means for measuring having a first range of measurement along said first measurement axis, said first measurement axis being parallel and in a spaced-apart relation to said shank axis;
   d. a reference point, said reference point being in a spaced-apart relation to said first measurement axis, said reference point defining a measurement plane perpendicular to said shank axis, said measurement plane intersecting said first measurement axis within said first range of measurement;
   e. a reference surface integral to said body, said body having a lower side, said lower side defining said reference surface, said reference surface being configured to selectably engage a calibration surface.

15. The apparatus of claim 14 wherein said reference point is fixed with respect to said body, said reference point depends from said lower side of said body, said reference surface defines a reference location, said reference location defines a reference plane perpendicular to said shank axis, said reference point is fixed at a pre-determined distance perpendicular to said reference plane.

16. The apparatus of claim 15, further comprising: a calibration spacer, said calibration spacer being configured to engage said reference location during a calibration of said first means for measuring, said calibration spacer having a thickness equal to said pre-determined distance between said reference location and said measurement plane, whereby said apparatus may be selectably supported on a calibration surface by said calibration spacer engaging said calibration location and by said reference point engaging said calibration surface.

17. The apparatus of claim 15 further comprising: a first measuring tip operably connected to said first means for measuring, said first measuring tip defining said first range of measurement, said first measuring tip and said reference surface being configured so that said first measuring tip is urged to a predetermined first calibration position relative to said measurement plane when said reference surface selectably engages said calibration surface.

18. The apparatus of claim 17 wherein said reference surface is parallel to said measurement plane and wherein said first calibration location is flush with said reference surface.

19. The apparatus of claim 18 wherein said shank has a second end, said reference point is defined by said second end of said shank.

20. The apparatus of claim 14 wherein said reference point is movable with respect to said body, the apparatus further comprising:
   a. a first measuring tip connected to said first means for measuring, said first measuring tip being movable through and defining said first range of measurement;
   b. a second means for measuring operably connected to said body, said second means for measuring defining a second measurement axis, said second means for measuring having a second range of measurement along said second measurement axis, said second measurement axis being parallel to said first measurement axis, said second measurement axis being in a spaced-apart relation to said first measurement axis;
   c. a second measuring tip connected to said second means for measuring, said second measuring tip being movable through and defining said second range of measurement, said second measuring tip defining said reference point.

21. The apparatus of claim 20 wherein
   a. said reference surface is configured to selectably engage a calibration surface, said first measuring tip is configured to be urged into a first calibration position by said calibration surface when said reference surface is in selectable engagement with said calibration surface, said first calibration position being within said first range of measurement, said first calibration position being located at a pre-determined distance perpendicular to said measurement plane when said reference surface is in said selectable engagement with said calibration surface,
   b. said second measuring tip is configured to be urged into a second calibration position by said calibration surface when said reference surface is in selectable engagement with said calibration surface, said second calibration position being within said second range of measurement, whereby said second calibration position of said second measuring tip defines said measurement plane when said reference surface is in selectable engagement with said reference surface.

22. The apparatus of claim 21 wherein said pre-determined distance perpendicular to said measurement plane is substantially zero, whereby said first measuring tip is located on said measuring plane defined by said second measuring tip when said calibration surface is in selectable engagement with said reference surface.

23. The apparatus of claim 22 wherein said calibration surface is a surface plate.

24. An apparatus for determining the angular relationship between a spindle of a machine tool and a work surface of the machine tool, the apparatus comprising:
   a. a transversely-extending body including an integral reference surface on a bottom portion thereof;
   b. an elongated shank attached to said body, the longitudinal axis of said shank being aligned perpendicular to said reference surface; and
   c. first and second gauges mounted at spaced-apart locations on said transversely-extending body, each of said gauges having a movable measuring tip, said gauges being positioned relative to said reference surface such that each of said measuring tips can be moved within the range of measurement of said gauge to a position flush with said reference surface.

25. The device of claim 24, further comprising: a pair of vertical holes defined by said transversely-extending body, each of said holes extending through said reference surface, each of said gauges having a shank, each of said vertical holes being configured to receive and to retain one of said shanks of one of said gauges.

26. The device of claim 25 wherein a lower portion of said body includes a pair of spaced-apart, downwardly-extending portions connected by a laterally-extending portion, wherein each of said downwardly-extending portions is aligned with one of said vertical holes, and wherein each of said downwardly-extending portions has a flat formed thereon which is coplanar with said reference surface.

27. An apparatus for determining the angular relationship between a spindle of a machine tool and a work holding surface of the machine tool, the apparatus comprising:
   a. a shank having a first shank end and a second shank end, said shank defining a shank axis, said first end of said shank being adapted to engage the spindle of the machine tool;
   b. a body, said second end of said shank being attached to said body;
   c. a pivot pin attached to said body;
   d. a rocker pivotally attached to said pivot pin, said rocker defining a cam surface, said rocker further defining a lower surface, said lower surface being configured to engage the work holding surface, said cam surface defining a pre-determined curvature;
   e. a first gauge attached to said body, said first gauge having a first measuring tip, said first gauge measuring tip defining a first measurement axis, said first measurement axis being parallel to said shank axis, said first gauge measuring tip engaging said cam surface.

28. The apparatus of claim 27, further comprising:
   a. a body calibration hole defined by said body;
   b. a rocker calibration hole defined by said rocker, said body calibration hole and said rocker calibration hole being in alignment when said lower surface of said rocker is perpendicular to said shank axis;
   c. a calibration pin, said calibration pin being sized to hold said body calibration hole and said rocker calibration hole in alignment.

* * * * *